(12) United States Patent  
Tiwari et al.

(10) Patent No.: US 8,175,279 B2
(45) Date of Patent: May 8, 2012

(54) INTEGRATED VEHICLE AUDIO SYSTEM

(75) Inventors: Nachiketa Tiwari, Mansfield, MA (US); George Nichols, Dover, MA (US); Brandon Westley, Hopkinton, MA (US); Christopher Ludwig, White Lake, MI (US)

(73) Assignee: Bose Corporation, Framingham, MA (US)

( * ) Notice: Subject to any disclaimer, the term of this patent is extended or adjusted under 35 U.S.C. 154(b) by 857 days.

(21) Appl. No.: 12/248,341

(22) Filed: Oct. 9, 2008

(65) Prior Publication Data

US 2010/0091997 A1    Apr. 15, 2010

(51) Int. Cl.
*H04R 5/00* (2006.01)

(52) U.S. Cl. .................... 381/1; 381/2; 381/86
(58) Field of Classification Search .............. 381/71.4, 381/86, 302, 365, 395
See application file for complete search history.

(56) References Cited

U.S. PATENT DOCUMENTS

| | | | |
|---|---|---|---|
| 2,662,975 A | 12/1953 | Schwarz | |
| 2,866,891 A | 12/1958 | Princ | |
| 3,071,728 A | 1/1963 | Grace et al. | |
| 3,103,630 A | 9/1963 | Pitts | |
| 3,134,945 A | 5/1964 | Wertheimer | |
| 4,020,284 A * | 4/1977 | Phillips | 381/2 |
| 4,807,292 A | 2/1989 | Sorscher | |
| 5,418,836 A | 5/1995 | Yazaki et al. | |
| 5,758,267 A * | 5/1998 | Pinder et al. | 455/90.2 |
| 5,864,627 A * | 1/1999 | Kim | 381/86 |
| 5,910,882 A | 6/1999 | Burrell | |
| 6,370,037 B1 | 4/2002 | Schoenfish | |
| 6,647,121 B2 | 11/2003 | Stanberry et al. | |
| 6,856,043 B2 | 2/2005 | DeLeeuw | |
| 2003/0228021 A1* | 12/2003 | Letinturier et al. | 381/86 |
| 2004/0032543 A1 | 2/2004 | Chang | |
| 2005/0089179 A1* | 4/2005 | Laraia | 381/120 |
| 2006/0112409 A1* | 5/2006 | Yoon | 725/75 |
| 2006/0134959 A1* | 6/2006 | Ellenbogen | 439/297 |
| 2007/0116298 A1 | 5/2007 | Holmi et al. | |

FOREIGN PATENT DOCUMENTS

| | | |
|---|---|---|
| EP | 1475991 | 11/2004 |
| JP | 54070005 | 6/1979 |
| JP | 01113988 | 5/1989 |
| JP | 07298381 | 11/1995 |
| WO | 9219065 | 10/1992 |

OTHER PUBLICATIONS

International Search Report and Written Opinion dated Nov. 12, 2009 for PCT/US2009/056071.

* cited by examiner

*Primary Examiner* — Cuong Q Nguyen
*Assistant Examiner* — Yosef Gebreyesus
(74) *Attorney, Agent, or Firm* — Bose Corporation

(57) ABSTRACT

A loudspeaker, amplifier, media source, user interface, and mechanical interface are all contained in a single unit. The unit has a first portion configured to mount in a vehicle radio mounting location and a second portion configured to extend significantly outside the vehicle radio mounting location.

13 Claims, 4 Drawing Sheets

Figure 2A:
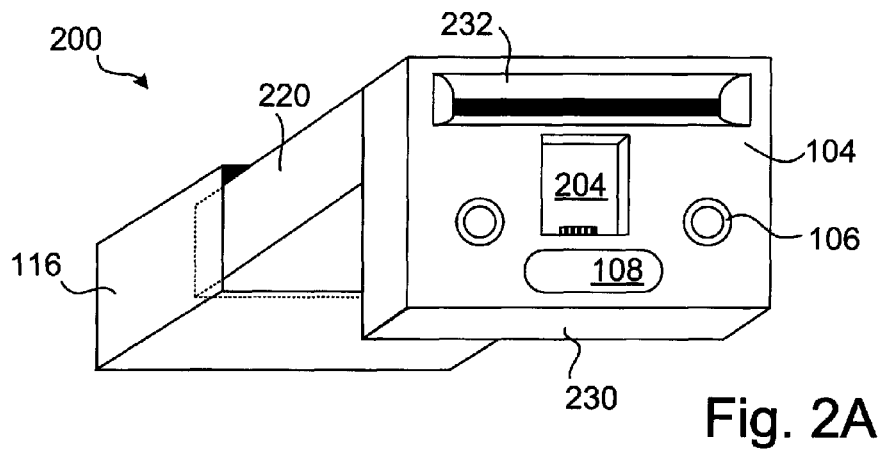

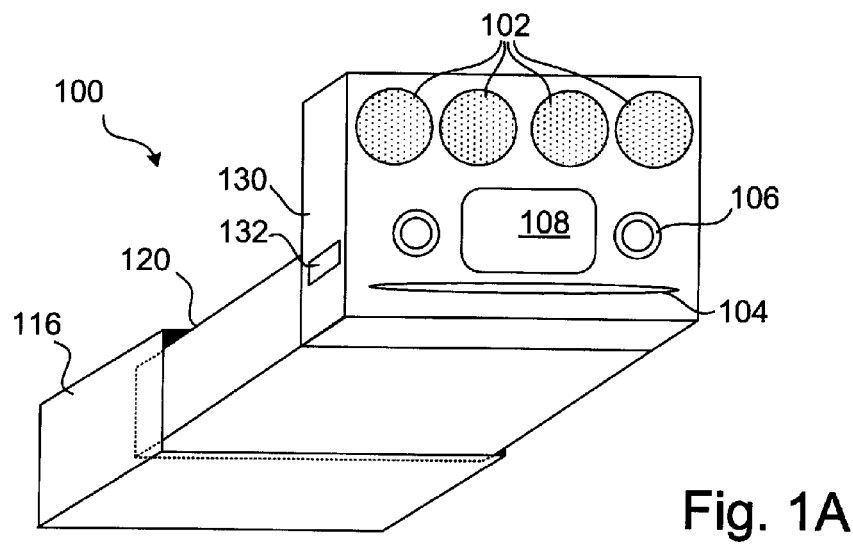
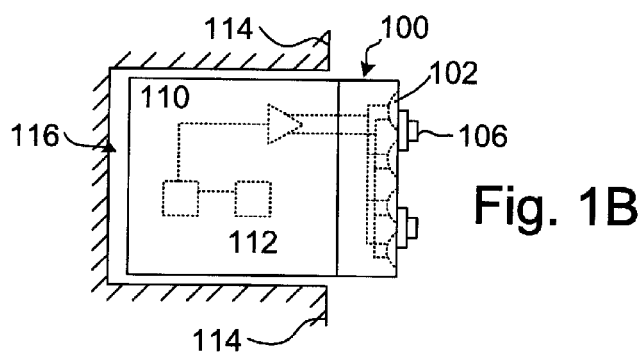
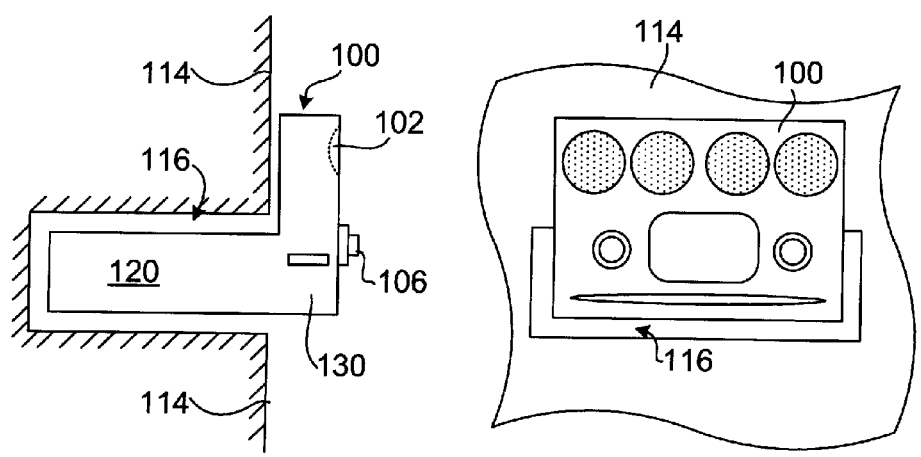

INTEGRATED VEHICLE AUDIO SYSTEM

BACKGROUND

This disclosure relates to an integrated vehicle audio system.

Audio systems in vehicles, such as cars, SUVs, and trucks, typically include four or more loudspeakers located around the vehicle and a centralized electronics unit, referred to as a head unit, including amplifiers, control electronics, media sources, and a user interface. In some examples, the amplifiers or media sources are external from the head unit and located in other parts of the vehicle, such as under a seat or in the trunk. In some examples, the user interface is separate from the other electronics.

Audio systems in homes and other locations may include a set of loudspeakers connected to a central receiver and amplifier, or they may be integrated all-in-one units in which the loudspeakers, media sources, amplifiers, and control electronics are all packaged in a single unit.

By "loudspeaker," we refer to a set of one or more electroacoustic transducers in a housing that delivers acoustic energy to a listening area in response to an electrical signal. Electroacoustic transducers are sometimes referred to as "drivers" or simply "speakers."

SUMMARY

In general, in some aspects, a loudspeaker, an amplifier coupled to the loudspeaker, a source of media content coupled to the amplifier, a user interface, and a mechanical interface are all contained in a single unit. The unit has a first portion configured to mount in a vehicle radio mounting location and a second portion configured to extend significantly outside the vehicle radio mounting location when the first portion is so mounted.

Implementations may include one or more of the following features. The vehicle radio mounting location is a 1 DIN or 2 DIN slot. The unit is operable to playback audio from the source of media content when the single unit is mounted in the radio mounting location and is also operable to playback the audio when the single unit is not so mounted. Equalization electronics are configured to automatically apply a first equalization to audio signals provided by the source of media content when the first portion of the unit is mounted in the mounting location, and automatically apply a second equalization to the audio signals when the first portion is not so mounted. The second portion is configured to extend in a direction transverse to a depth of the first portion, such that the second portion is positioned in front of a surface adjacent to the mounting location when the first portion is mounted in the mounting location. The first portion is configured to mount in the mounting location in both of a first and a second orientation. The unit includes an orientation detection switch, and the user interface is configured to switch between a first mode and a second mode in response to a state of the orientation detection switch. The amplifier is configured to alter a signal connection between the source of media content and the loudspeaker in response to the state of the orientation detection switch. The loudspeaker includes an electroacoustic transducer located in the second portion of the unit with a first radiating surface exposed to a listening area. The loudspeaker includes an electroacoustic transducer located in the first portion of the unit with a first radiating surface acoustically coupled to a listening area through a passive acoustic element. The loudspeaker includes an electroacoustic transducer located in the first portion of the unit with a first radiating surface acoustically coupled to an opening located on a side of the first portion that is enclosed by the mounting location when the first portion is mounted in the mounting location and is exposed to a listening area when the first portion is not so mounted. The loudspeaker includes an array of electroacoustic transducers. The source of media content is one or more of a portable media player, an optical disc player, a radio tuner, and a data connection port.

Advantages include providing a high-quality in-vehicle audio experience from a compact, integrated audio system that is also usable when removed from the vehicle.

Other features and advantages will be apparent from the description and the claims.

DESCRIPTION

Figure 3A:
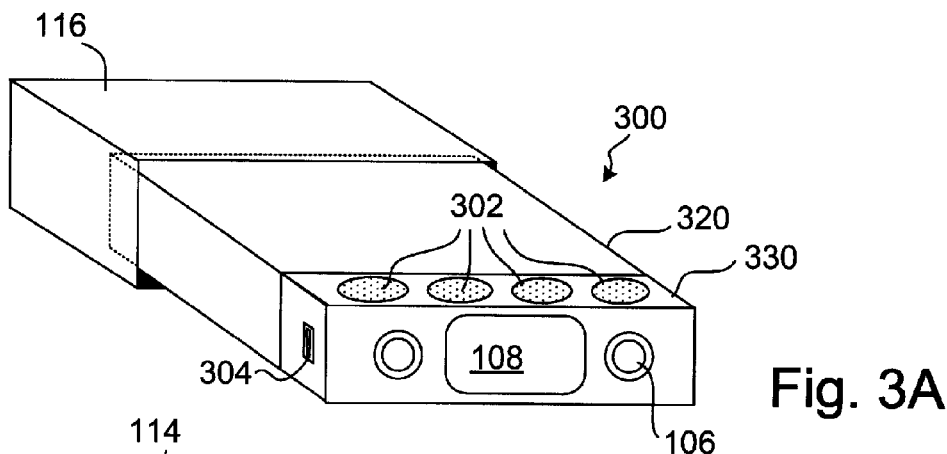

FIGS. 1A, 2A, and 3A show isometric views of integrated vehicle audio systems.

Figure 2B:
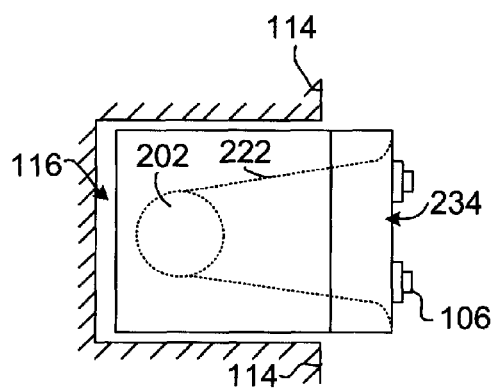
Figure 3B:
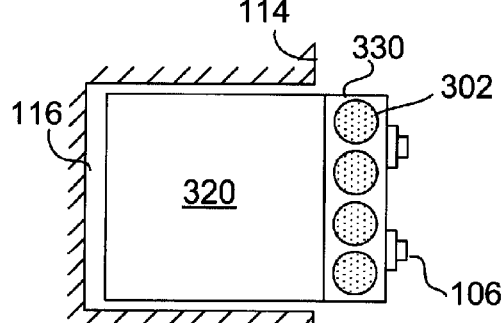

FIGS. 1B, 2B, and 3B show top views of integrated vehicle audio systems with the surrounding instrument panel cut away.

Figure 2C:
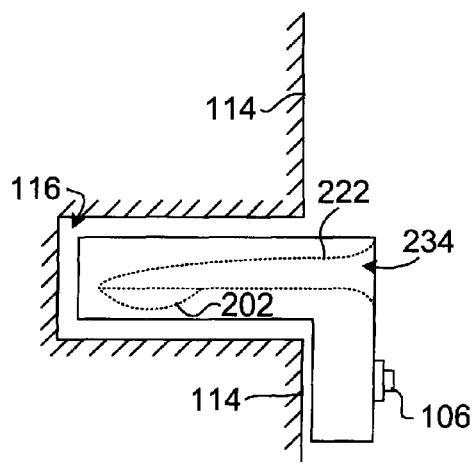
Figure 3C:
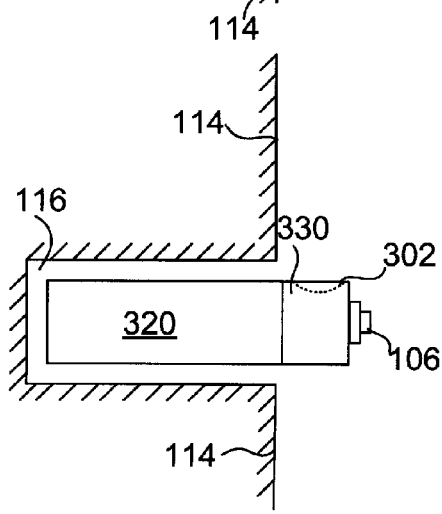

FIGS. 1C, 2C, and 3C show side views of integrated vehicle audio systems with the surrounding instrument panel cut away.

Figure 2D:
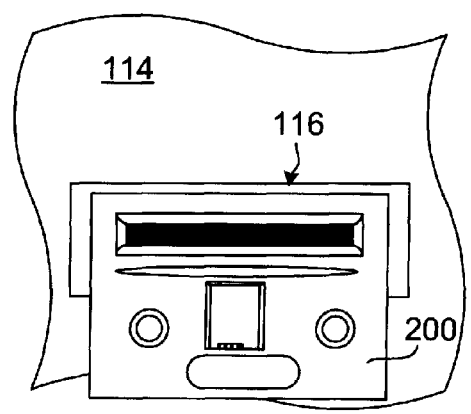
Figure 3D:
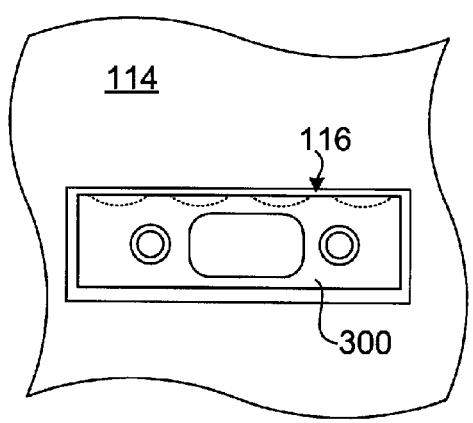

FIGS. 1D, 2D, and 3D show front views of integrated vehicle audio systems.

Figure 4:
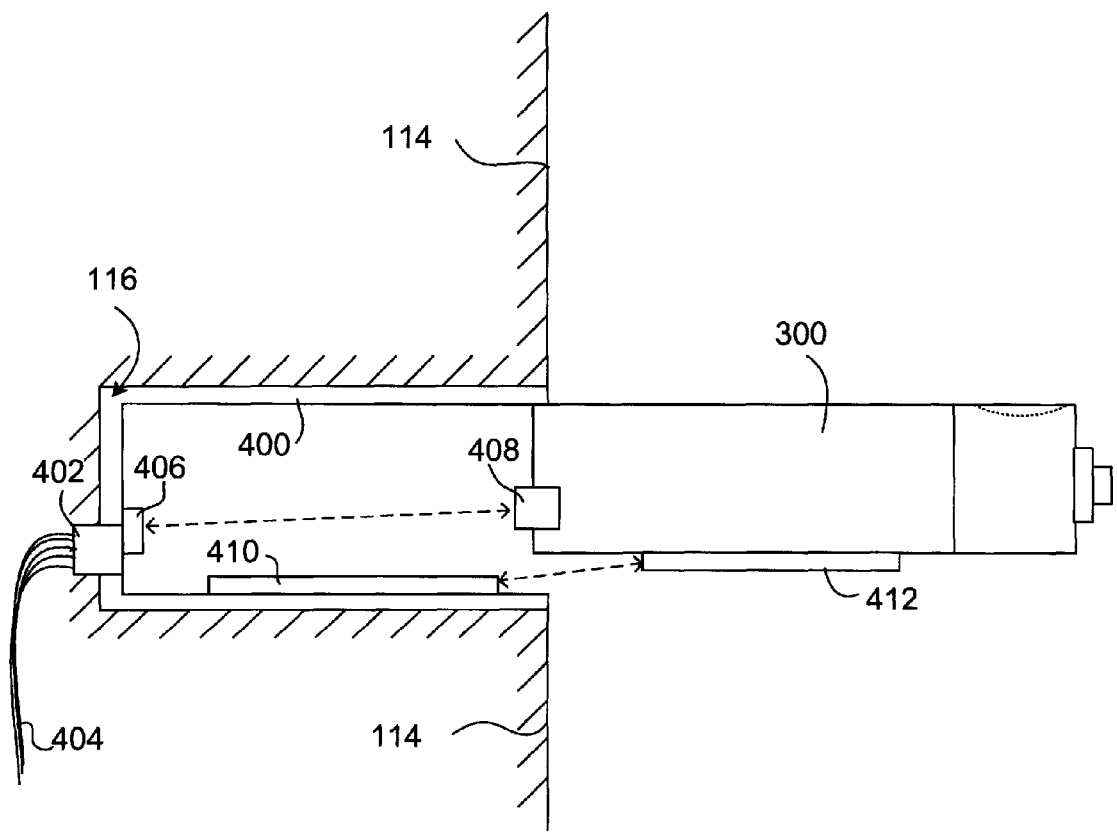

FIG. 4 shows a side cutaway view of an integrated vehicle audio system.

As shown in FIGS. 1A-D, an integrated vehicle audio system contains electroacoustic transducers 102, media sources 104, user interface elements 106, 108, amplifiers 110, and control electronics 112 in a single audio unit 100 to be located in the instrument panel 114 of a vehicle. For clarity, the amplifiers 110 and control electronics 112 are shown abstractly and only in FIG. 1B. The audio unit 100 uses a standardized mounting location 116 for car stereos, referred to as a "1-DIN" or "2-DIN" slot, but may extend beyond the mounting location 116 to provide greater sound radiating area and user interface area than is provided by a standard car stereo that would fit entirely within the mounting location 116. In some examples, the audio unit 100 is removable, using the mounting location 116 as a docking station. The mounting location 116 is shown larger than the audio unit in the figures for illustration purposes; in practice the two would fit closely together. Other mounting locations, such as cupholders, may also be used.

In the example of FIGS. 1A-D, a second portion 130 of the audio unit 100 extends out and upward from the mounting location 116. In other examples, as shown in FIGS. 2A-D and 3A-D, the second portion may extend downward (second portion 230 of unit 200 in FIGS. 2A-D) or only outward (second portion 330 of unit 300 in FIGS. 3A-D). The particular arrangement of transducers 102, 202, 302, user interface elements 106, 108, 206, 208, 306, 308, and media sources 104, 204, 304, are shown as examples only. Those elements as well as the amplifiers and electronics may be located in either portion, depending on mechanical, electrical, thermal, acoustic, or other considerations in a given implementation. The particular arrangement of acoustic, electronic, and interface elements in any of FIGS. 1A-D, 2A-D, and 3A-D does not indicate that the configuration of the audio units in those figures is limited to the arrangement of elements shown. Other arrangements are also possible, for example, the transducers 102 or 202 may be located on the top surfaces of the respective units 100, 200, like the transducers 302 in unit 300. The particular arrangements of transducers, media sources, and user interface elements depends on the size and acoustic capabilities of the components and requirements of the vehicle into which the unit is to be installed. In some examples, where the unit is not designed with a single vehicle in mind or is designed for a known set of vehicles, an arrangement is selected that will provide good audio performance in the widest range of vehicles.

The media sources 104, 204, 304, can be any appropriate source of media content for playback on an audio system. In the example of FIG. 1, the media source 104 is shows as a slot, as for a CD drive. In the example of FIG. 2, the media source 204 is shown as a socket, such as a dock for a portable media player. In the example of FIG. 3, the media source 304 is shown as a data port, such as a USB port for connecting a portable media player, flash memory drive, or any other media source having a USB output. Each of these types or any other type of media source may be used in each of the configurations shown in the respective figures.

In some examples, the unit is reversible, that is, it can be installed with the second portion extending either upward or downward. In this case, a switch is provided that changes the orientation of the user interface, such that the display remains right-side-up and knobs or buttons located to the right or left side are reversed in function. The switch may be automatically triggered by installation of the unit into the mounting location 116, or it may be part of or accessed through the user interface. In some examples the switch is an accelerometer that detects the orientation of the unit relative to gravity. In cases where the unit provides stereo or other geometrically-separated sound, the left and right sides of the sound image are also reversed when the unit is inverted.

In some examples, part of the volume occupied by the audio unit is used as an acoustic volume to modify the acoustic performance of the transducers. For example, a volume (not shown) behind the user interface elements 106, 108 of unit 100 may be coupled to one or more of the transducers 102 and ported through a bass reflex port 132 on the side of the unit. In other examples, as shown in FIGS. 2A-2D, a transducer 202 is located in the first portion, coupled to a passive acoustic element such as a horn 222, an acoustic volume, or a waveguide within the first portion, and delivered to the listening area through an opening 232 in the second portion or through other volumes or ducting in the instrument panel. In some examples, at least one transducer in the audio unit is coupled to the volume of the instrument panel through the back or sides of the unit. Audio delivered by that transducer is then coupled to the listening area through other openings in the instrument panel. Such a configuration can be used to improve the overall acoustic profile of the audio unit, such as by smoothing the frequency response at the listeners head and expanding the perceived sound stage. Providing an acoustic volume in an instrument panel is described in U.S. patent application Ser. No. 11/551,410, titled Low Frequency Electroacoustical Transducing in a Vehicle, filed on Oct. 20, 2006, and incorporated here by reference. Coupling a transducer to a listening area through ducts in the instrument panel to other drive points is described in U.S. patent application entitled Ducting Sound, filed at the same time as this application and incorporated here by reference. Acoustic waveguides, volumes, and other applicable passive acoustic elements are well known. In some examples, transducers located within the unit are coupled to the top, bottom, or sides of the first portion such that they deliver sound into the instrument panel when mounted and deliver sound directly to the listening area when the unit is removed.

Electrical connections to power the audio unit and, in some examples, to provide connections to external media sources or additional acoustic transducers, are provided in the mounting location 116. In some examples, as shown in FIG. 4 (using the audio unit 300 of FIGS. 3A-D for illustration only), a docking unit 400 is installed in the mounting location 116. The docking unit includes a permanent connection 402 to the vehicle's wiring 404 and an electrical connector 406 that releasably mates with a matching connector 408 on the audio unit 100, 200, or 300. The docking unit 400 also includes a mechanical interface 410 that mates to a mechanical interface 412 on the audio unit 100, 200, or 300, to secure the unit while docked. The interface shown in FIG. 4 is for illustration only—any suitable mechanical interface may be used. Factors affecting the design of the mechanical interface may include the weight of the audio unit, motor vehicle safety regulations, and ergonomic considerations, to name a few examples. A fully mechanical release (not shown) may be provided, or the release may be controlled electronically or electro-mechanically through the user interface of the audio unit. In some examples, the docking unit 400 is installed in some location other than a standard 1-DIN or 2-DIN radio slot, such as an ashtray, cup holder, or storage bin.

In some examples, to provide high-quality audio, including separation of stereo or multi-channel sources, the transducers 102, 202, 302, are configured as an array-type loudspeaker. Array loudspeakers are described, for example, in U.S. patent application Ser. No. 11/282,871, titled Vehicle Directional Electroacoustical Transducing, filed on Nov. 28, 2005, and incorporated here by reference. In an array loudspeaker, transducers are used in combination to enhance sound in one direction and decrease sound output in another direction. For example, the transducers 102 in audio unit 100 may be configured as an array to steer left-channel stereo signals to the far left of the vehicle (for the left-hand passenger's left ear) and to a position slightly right of center (for the right-hand passenger's left ear), while steering right-channel stereo signals to the far right of the vehicle (for the right-hand passenger's right ear) and to a position slightly left of center (for the left-hand passenger's right ear). More advanced audio steering arrangements are possible, depending on the number and capability of transducers, the content of the media sources, the processing capabilities of the electronics, and the acoustic environment of the vehicle.

Removing the audio unit from the vehicle provides security by preventing it from being stolen. The utility of the audio unit is further enhanced if it remains usable when not mounted in the vehicle. To provide good acoustic quality both in the vehicle and outside it, the electronics of the audio unit are configured to change the equalization and other characteristics of the audio signals delivered to the transducers. For example, the array-based sound steering described above may be less useful outside of a vehicle, and the transducers are instead used cooperatively to boost the overall volume (i.e., sound pressure level measured at a listening position) of the audio unit. As another example, an equalization designed to compensate for acoustic dips and peaks unique to a vehicle environment would not be necessary, and may be undesirable, when the unit is used in relatively free space. In some examples, the electrical connection between the audio unit and docking unit is used to trigger a change in the acoustic output, so that the user does not have to take any additional steps to receive good audio output regardless whether the unit is used in-vehicle or outside. In some examples, the audio unit includes a microphone so that it can measure the acoustics of its environment and adjust its performance accordingly.

In some examples, the audio unit includes internal batteries that allow it to be operated outside of the vehicle, such as at a picnic. In some examples, the audio unit is operable outside of the vehicle but must be plugged in to an external source of power. The external power source may be a household electrical outlet or a portable battery pack. In the example of a portable battery pack, the battery pack partially duplicates the mounting location from the vehicle, with electrical connector 406 and mechanical interface 410, so that the audio unit is attached to the battery pack in the same manner as it is attached to the vehicle. Likewise, for powering the audio unit from an electrical outlet, an adapter or docking station provides the same mounting interface and connectors as are provided in the vehicle. Alternatively, in some examples, the unit includes a second electrical connection for use with battery packs and electrical outlets. This is useful where, for example, the user does not want to purchase an additional docking station or where there is a standard type of connector available for consumer use that is not suitable for use in a vehicle, or vice-versa, where the connector used for connections in the vehicle is not suitable or is inconvenient for use outside of the vehicle.

Other implementations are within the scope of the following claims and other claims to which the applicant may be entitled.

What is claimed is:

1. An apparatus comprising:
a loudspeaker;
an amplifier coupled to the loudspeaker;
a source of media content coupled to the amplifier;
a user interface; and
a mechanical interface;
wherein the loudspeaker, amplifier, source of media content, user interface, and mechanical interface are all contained in a single unit having a first portion configured to mount in a vehicle radio mounting location and a second portion configured to extend significantly outside the vehicle radio mounting location when the first portion is so mounted,
the first portion contains at least one of the loudspeaker, the amplifier, the source of media content, or the user interface;
the second portion contains at least one other of the loudspeaker, the amplifier, the source of media content, or the user interface; and
the second portion is configured to extend in a direction transverse to a depth of the first portion, such that the second portion is positioned in front of a surface adjacent to the mounting location when the first portion is mounted in the mounting location.

2. The apparatus of claim 1, wherein the vehicle radio mounting location is a 1 DIN or 2 DIN slot.

3. The apparatus of claim 1, wherein the apparatus is operable to playback audio from the source of media content when the single unit is mounted in the vehicle radio mounting location and is also operable to playback the audio when the single unit is not so mounted.

4. The apparatus of claim 3, further comprising:
equalization electronics configured to:
automatically apply a first equalization to audio signals provided by the source of media content when the first portion of the unit is mounted in the mounting location, and
automatically apply a second equalization to the audio signals when the first portion is not so mounted.

5. The apparatus of claim 1, wherein:
the first portion is configured to mount in the mounting location in both of a first and a second orientation.

6. The apparatus of claim 5, further comprising:
an orientation detection switch,
wherein the user interface is configured to switch between a first mode and a second mode in response to a state of the orientation detection switch.

7. The apparatus of claim 1, wherein:
the loudspeaker comprises an electroacoustic transducer located in the second portion of the unit with a first radiating surface exposed to a listening area.

8. The apparatus of claim 1, wherein:
the loudspeaker comprises an electroacoustic transducer located in the first portion of the unit with a first radiating surface acoustically coupled to a listening area through a passive acoustic element.

9. The apparatus of claim 1, wherein:
the loudspeaker comprises an electroacoustic transducer located in the first portion of the unit with a first radiating surface acoustically coupled to an opening located on a side of the first portion that is enclosed by the mounting location when the first portion is mounted in the mounting location and is exposed to a listening area when the first portion is not so mounted.

10. The apparatus of claim 1, wherein the loudspeaker comprises an array of electroacoustic transducers.

11. The apparatus of claim 1, wherein the source of media content is one or more of a portable media player, an optical disc player, a radio tuner, and a data connection port.

12. An apparatus comprising:
a loudspeaker;
an amplifier coupled to the loudspeaker;
a source of media content coupled to the amplifier;
a user interface;
a mechanical interface; and
an orientation detection switch,
wherein the user interface is configured to switch between a first mode and a second mode in response to a state of the orientation detection switch;
the loudspeaker, the amplifier, the source of media content, the user interface, and the mechanical interface are all contained in a single unit having a first portion configured to mount in a vehicle radio mounting location and a second portion configured to extend significantly outside the vehicle radio mounting location when the first portion is so mounted; and
the amplifier is configured to alter a signal connection between the source of media content and the loudspeaker in response to the state of the orientation detection switch.

13. The apparatus of claim 12, wherein:
the second portion is configured to extend in a direction transverse to a depth of the first portion, such that the second portion is positioned in front of a surface adjacent to the mounting location when the first portion is mounted in the mounting location.

* * * * *